(12) United States Patent
Clemens

(10) Patent No.: US 9,505,263 B2
(45) Date of Patent: Nov. 29, 2016

(54) WHEEL

(71) Applicant: Simon Richard Clemens, Armadale (AU)

(72) Inventor: Simon Richard Clemens, Armadale (AU)

( * ) Notice: Subject to any disclaimer, the term of this patent is extended or adjusted under 35 U.S.C. 154(b) by 74 days.

(21) Appl. No.: 14/388,992

(22) PCT Filed: Mar. 28, 2013

(86) PCT No.: PCT/AU2013/000325
§ 371 (c)(1),
(2) Date: Sep. 29, 2014

(87) PCT Pub. No.: WO2013/142910
PCT Pub. Date: Oct. 3, 2013

(65) Prior Publication Data
US 2015/0076895 A1    Mar. 19, 2015

(30) Foreign Application Priority Data

Mar. 30, 2012 (AU) ................................. 2012901286

(51) Int. Cl.
*B60B 23/08* (2006.01)
*B60B 3/04* (2006.01)
*B60B 23/06* (2006.01)

(52) U.S. Cl.
CPC ............... *B60B 3/041* (2013.01); *B60B 3/044* (2013.01); *B60B 23/06* (2013.01); *B60B 23/08* (2013.01); *B60B 2310/30* (2013.01); *B60B 2320/10* (2013.01); *B60B 2900/572* (2013.01); *B60B 2900/70* (2013.01); *Y10T 29/49497* (2015.01)

(58) Field of Classification Search
None
See application file for complete search history.

(56) References Cited

U.S. PATENT DOCUMENTS

2004/0021365 A1* 2/2004 Georgeff ................. B60B 3/002
301/11.2

FOREIGN PATENT DOCUMENTS

GB          755707 A  *  8/1956  ............. B60B 23/12

* cited by examiner

*Primary Examiner* — John Walters
*Assistant Examiner* — Hilary L Johns
(74) *Attorney, Agent, or Firm* — Charles H Jew

(57) ABSTRACT

A wheel comprising a rim portion and a center portion for supporting the rim portion, wherein the rim portion is adapted to allow attachment of the center portion to the rim at a selected position of a plurality of available positions. In one arrangement the available positions are disposed in a direction parallel to the axis of rotation of the wheel. There is also provided the rim and the center portion and a method for constructing the wheel.

22 Claims, 8 Drawing Sheets

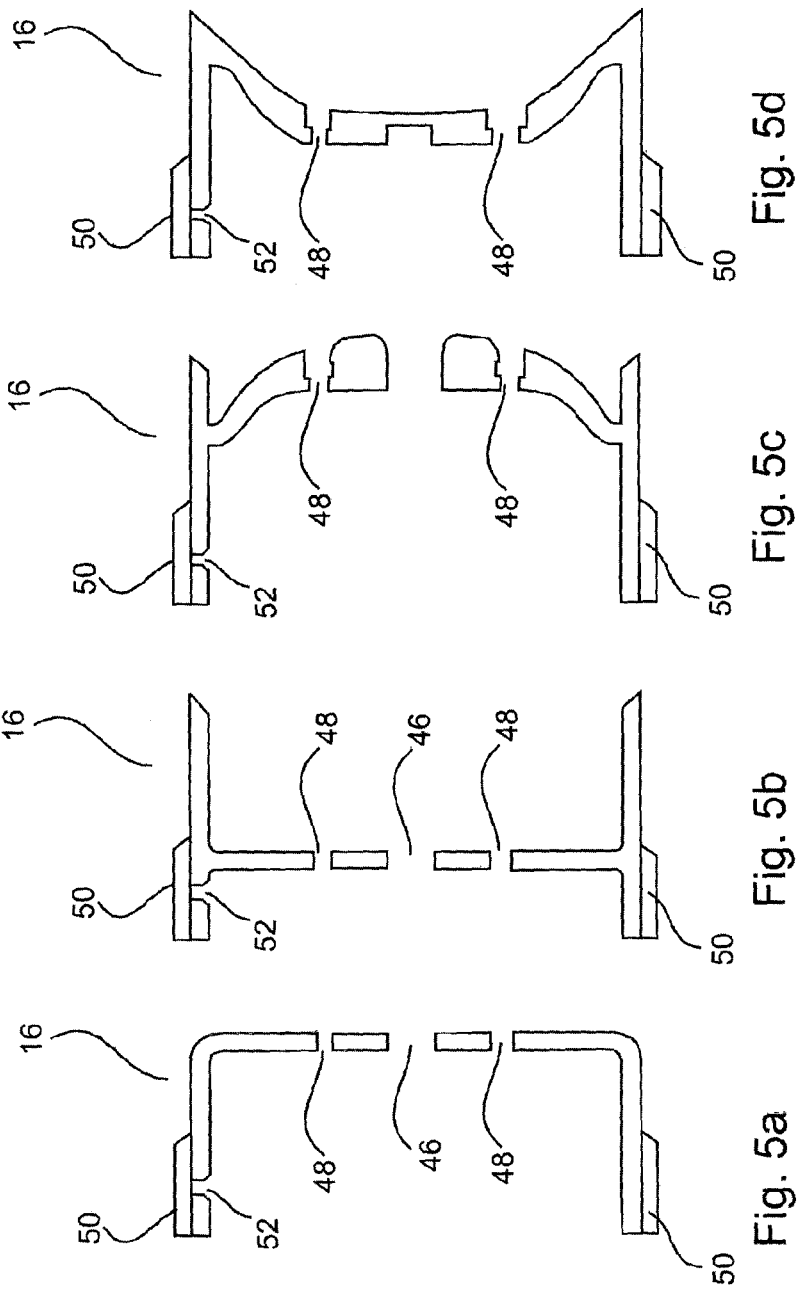

WHEEL

TECHNICAL FIELD

The present invention relates to wheels.

The invention has been devised particularly, although not necessarily solely, in relation to wheels for automotive vehicles.

BACKGROUND ART

The following discussion of the background art is intended to facilitate an understanding of the present invention only. The discussion is not an acknowledgement or admission that any of the material referred to is or was part of the common general knowledge as at the priority date of the application.

There are various types of wheel constructions and wheel specifications which differ between vehicles. The specifications for the wheel, which can vary between vehicles, include the number and relative positions of the mounting holes, and also the lateral position of the centre portion of wheel relative to the rim portion.

The wheels that are currently available have a laterally fixed offset/backspace design. This is referring to the specification of a particular wheel centre which cannot be laterally adjusted by a plain sliding action to an alternate offset/backspace location, within the existing rim body. Currently available wheels do not allow the end user to retain all the original components and adjust the offset/backspace position by a plain sliding action. This means that the specification of a particular wheel cannot be varied in order to fit a multitude of different type of vehicles. Thus, not necessarily any wheel may be fitted to a particular vehicle.

Moreover, on occasions drivers of vehicles are interested in varying the external appearance of a vehicle. An option for changing external appearance of a vehicle is to replace the wheels of the vehicles. In particular, the driver may want to replace the appearance of the centre disk of the wheels that are mounted on the driver's vehicle. For example, the driver of the vehicle may prefer to replace the shallow dish wheels with deep dish wheels.

Furthermore, vehicles are typically provided to their purchaser with a standard set of wheels. However, on occasions the purchaser of the vehicle would like to fit aftermarket wheels that differ from the wheels provided by the vehicle dealership. However, fitting of aftermarket wheels typically is a cumbersome task. The reason for this is that the wheels that are currently available have fixed designs. The fixed designs of the wheel represent great difficulties for fitting aftermarket wheels to different type of vehicles.

It is against this background that the present invention has been developed.

SUMMARY OF INVENTION

According to a first aspect of the invention there is provided a wheel comprising a rim portion and a centre portion for supporting the rim portion, wherein the rim portion is adapted to allow attachment of the centre portion to the rim at a selected position of a plurality of available positions.

Preferably, the available positions are disposed in a direction parallel to the axis of rotation of the wheel.

Preferably, the wheel comprises means for attaching the centre portion to the rim.

Preferably, the means for attaching the centre portion to the rim are adapted to transfer rotary movement of the centre portion to the rim portion.

Preferably, the means for attaching the centre portion to the rim comprises at least one spline and at least one groove adapted to receive the spline to allow sliding of the centre portion into the rim portion to one of the plurality of available positions.

Preferably, the rim portion presents a radially inner face comprising the groove.

Preferably, the centre portion is configured as a disc structure having an outer periphery dimensioned to be received within the confines of the radially inner face of the rim portion, the outer periphery comprising the spline.

Preferably, the wheel further comprises means for securing the centre portion to the rim portion at one of the available positions.

Preferably, the means for securing the centre portion to the rim portion comprises at least one opening traversing the outer periphery of the disc structure, the at least one opening being adapted to receive a screw.

Preferably, the means for securing the centre portion to the rim portion further comprises at least one threaded indentation adapted to receive the screw, the threaded indentation extending into the radially inner face of the rim.

Preferably, there are a plurality of grooves arranged in a spaced apart relationship with respect to each other around the radially inner face of the rim.

Preferably, there are a plurality of splines arranged in a spaced apart relationship with respect to each other around the outer periphery of the disc structure of the centre portion.

Preferably, there is at least one threaded indentation located between two neighbouring grooves and at least one opening traversing the outer periphery of the disc structure located between two neighbouring grooves.

Preferably, there are a plurality of threaded indentions defining a set of threaded indentations, each of the threaded indentations are arranged in a spaced apart relationship with respect to each other and parallel to the rotational axis of the wheel, each of the at least one threaded indentations providing a position of the plurality of available positions for securing the centre portion at a location along the rotational axis of the rim portion.

Preferably, there are more than one set of threaded indentions, the sets being arranged in a spaced apart relationship with respect to each other around the periphery of the radially inner face of the rim portion.

Preferably, there are a first set of threaded indentations and a second set of threaded indentations, the first set of threaded indentations and the second set of threaded indentations being alternatively arranged around the radially inner face of the rim.

Preferably, the first set of threaded indentations comprises at least one threaded indentation located at a first location parallel to the rotational axis of the wheel and the second set of threaded indentations comprises at least one threaded indentation located at a second location parallel to the rotational axis of the wheel, the second location being a different location with respect to the first location. In this arrangement, the second set of threaded indentations provide at least one second available position for securing the centre portion to the rim along the axis of rotation of the wheel, the second available positions being at a different location along the axis of rotation of the wheel with respect to the first available positions. In this arrangement, to locate the centre portion at any of the available positions provided by the first set of threaded indentations, the centre portion must be presented to the rim such that, when the centre portion is being inserted into the rim, the openings of the centre portion coincide with the threaded indentations of the first set of threaded indentations. However, to locate the centre portion at any of the available positions provided by the second set of threaded indentations, the centre portion must be presented to the rim such that, when the centre portion is being inserted into the rim, the openings of the centre portion coincide with the threaded indentations of the second set of threaded indentations.

Preferably, at least one spline and at least one groove are configured to have matching cross sections to allow the spline to be slideably received by the groove. This arrangement is particularly advantageous because it allows fitting particular centre portions to particular rims.

According to a second aspect of the invention there is provided a wheel comprising a rim portion and a centre portion for supporting the rim portion, wherein the centre portion is realisably attached to the rim portion.

Preferably, the wheel comprises means for attaching the centre portion to the rim.

Preferably, the means for attaching the centre portion to the rim comprises screw means.

Preferably, the means for attaching the centre portion to the rim comprises at least one spline and at least one groove adapted to receive the spline to allow sliding of the centre portion into the rim portion.

Preferably, the rim portion presents a radially inner face comprising the groove.

Preferably, the centre portion is configured as a disc structure having an outer periphery dimensioned to be received within the confines of the radially inner face of the rim portion, the outer periphery comprising the spline.

In alternative arrangement, the means for securing the centre portion to the rim portion comprises at least one keyed joint.

Preferably, the outer periphery of the centre disc and the radially inner face of the rim portion may be configured to define at least one keyway adapted to receive a key defining the keyed joint.

According to a third aspect of the invention there is provided a wheel rim comprising a radially inner portion defining a radially inner face to which a centre portion can be attached, wherein the radially inner portion is adapted to releasably attaching the centre portion to the radially inner face of the rim.

Preferably, the radially inner face of the wheel rim is adapted to attach the centre portion at a selected position of a plurality of available positions extending in a direction parallel to the axis of rotation of the wheel.

Preferably, the radially inner face comprising at least one groove adapted to slideably receive a spline of an outer periphery of the centre portion.

Preferably, the radially inner face comprises at least one threaded indentation adapted to receive a screw traversing the outer periphery of the centre portion for securing the centre portion to the rim.

Preferably, there are a plurality of threaded indentations arranged in a spaced apart relationship with respect to each other providing the plurality of available positions extending in a direction parallel to the axis of rotation of the wheel.

According to a fourth aspect of the invention there is provided a centre portion to be secured to a wheel rim, the centre portion being configured as a disc structure having an outer periphery dimensioned to be received within the rim, wherein the outer periphery is adapted to be releasably attached to the rim portion.

Preferably, the outer periphery comprises at least one spline adapted to be received by a groove of a radially inner face of the rim.

Preferably, the outer periphery comprises at least one opening traversing the outer periphery and adapted to receive a screw for securing the centre portion to the rim.

Preferably, the disc structure comprises a planar disc.

Preferably, the planar disc comprises a wheel shallow dish.

Preferably, the planar disc comprises a wheel deep dish.

According to a fifth aspect of the invention there is provided a method of constructing a wheel having a rim portion and a centre portion adapted to be attached to the rim portion, the method comprising the steps of:

locating the centre portion to the rim portion at a selected position; and releasably attaching the centre portion to the rim portion at the selected position Preferably, the method further comprises the step of sliding the centre portion parallel to the rotational axis of the wheel to the selected position.

Preferably, the method further comprises the step of rotating the centre portion around the rotational axis of the wheel to insert at least one spline of the centre portion into a groove of the rim portion.

BRIEF DESCRIPTION OF THE DRAWINGS

Further features of the present invention are more fully described in the following description of a non-limiting embodiment thereof. This description is included solely for the purposes of exemplifying the present invention. It should not be understood as a restriction on the broad summary, disclosure or description of the invention as set out above. The description will be made with reference to the accompanying drawings in which:

FIG. 1b is a side view of the wheel shown in FIG. 1a;

FIG. 2 is a rear view of the rim of the wheel shown in FIG. 1a;

FIG. 3a is a rear view of an arrangement of the centre disc of the wheel shown in FIG. 1a;

FIG. 3b is a perspective view of an arrangement of the centre disc of the wheel shown in FIG. 1a;

FIGS. 5a to 5d are side cross-sectional views of the first to fourth arrangements of the centre disk in accordance with the present embodiment of the invention.

DESCRIPTION OF EMBODIMENTS

Figure 1A:
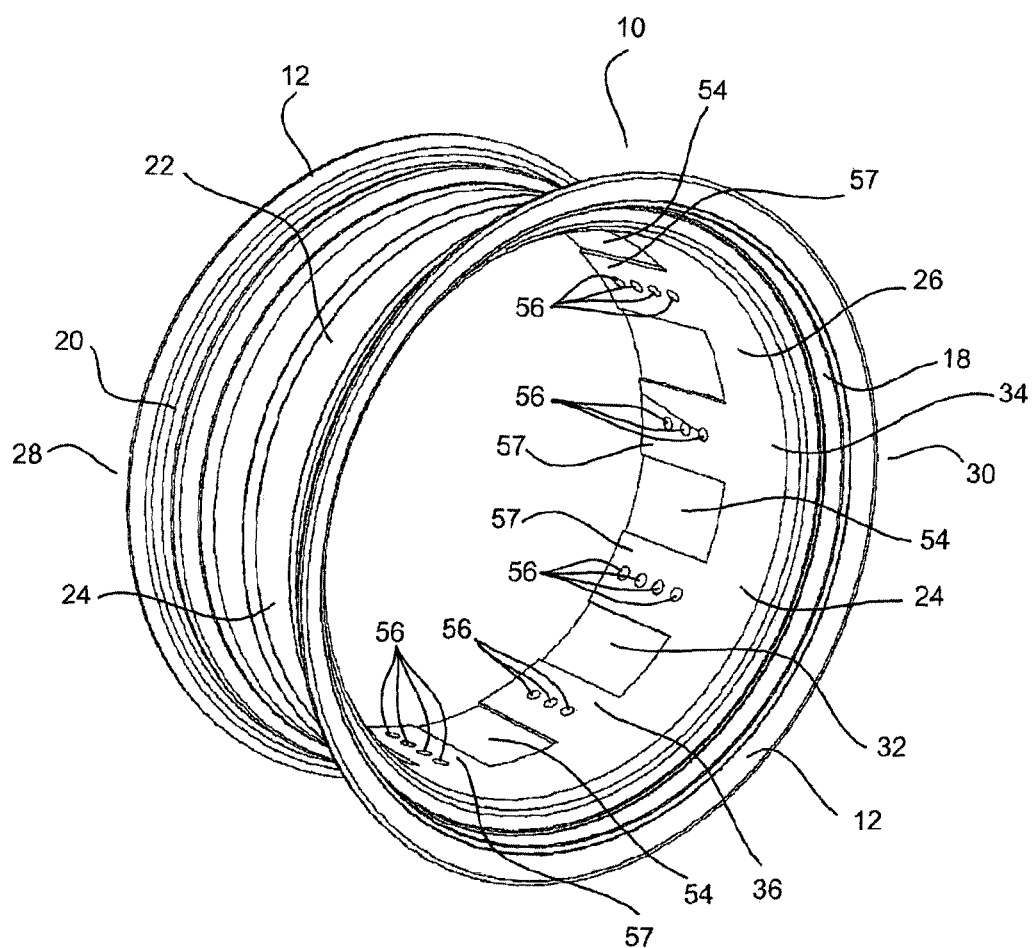
FIG. 1a is a perspective view of a wheel according to an embodiment of the invention.

FIGS. 1 to 4 show a wheel 10 in accordance with an embodiment of the invention. The wheel 10 comprises a rim portion 12 (see FIG. 1) and a central portion 14 configured as a centre disc or centre portion 16 (see FIG. 3). FIGS. 5a to 5d show first to fourth arrangements of the centre disc 16 in accordance with the present embodiment of the invention. The centre disc 16 is adapted to be attached to the rim portion 12 of the wheel 10. In accordance with the present embodiment of the invention, the centre disc 16 may be attached along the axis of rotation of the rim portion 12 at one of a plurality available positions of the rim portion 12. In this manner, additional offset positions for the wheel 10 are provided. This allows fitting a particular wheel 10 to, a multitude of different type of vehicles in view that the offset/backspace position of the wheel may be varied, for example, by a plain sliding action which moves laterally the centre member or portion 14. In accordance with the present embodiment of embodiments of the invention the sliding action may be accomplished in view that the rim portion 12 is adapted to slideably receive the centre portion 14, via for example, via spline/groove arrangements or keyways.

Further, in a further embodiment of the invention the centre disc 16 is releasably attached to the rim portion 12. This is particularly useful because it allows changing the external appearance of the wheel 10 (by replacing the centre disc 16 with a different centre disc 16). This allows ongoing modification of the wheel 10 to keep up with latest trends in accordance with the preferences of the driver of the vehicle.

The rim portion 12 comprises an annular body 18 incorporating rim flanges 20 at opposed sides thereof and a rim well 22. The rim well 22 defines a radially inner portion 24 of the rim portion 12 which presents a radially inner face 26. The radially inner face 26 is of an annular configuration centred about the axis of rotation of the wheel 10.

The rim portion 12 comprises a front portion 30 and a rear portion 28. The front portion 30 is oriented to the exterior of the vehicle to which the wheel 10 is attached. The rear portion 28 is directed to the interior of the vehicle.

Figure 1B:
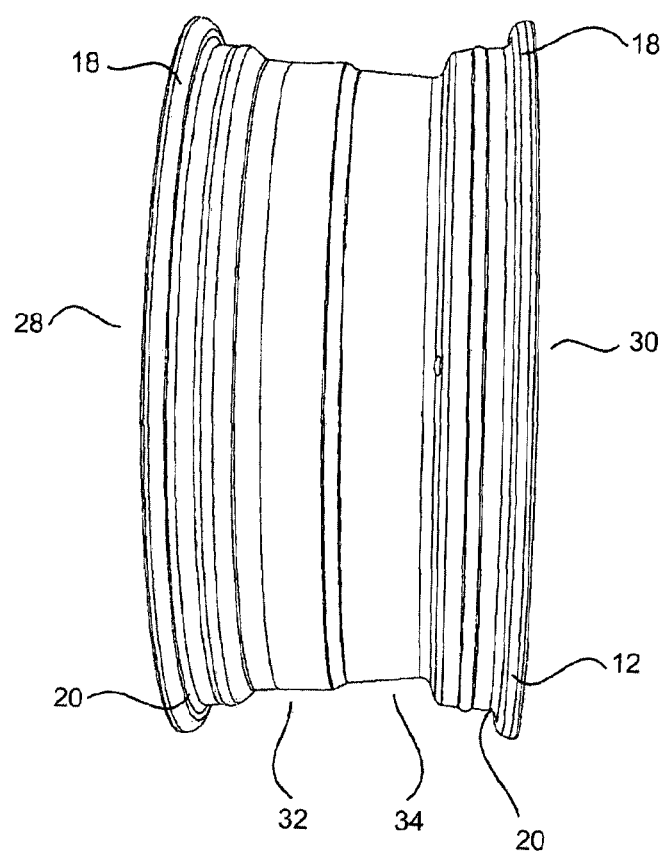

The annular inner face 26 of the rim portion 12 comprises two sections 34 and 32 (see FIG. 1b). The first section 34 is located in the front portion 30 of the rim portion 12. The second section 32 is located at the rear portion 28 of the rim portion 12. The second section 32 is adapted for receiving the centre disc 16. The second section 32 comprises means 36 for attaching the centre disc 16 to the rim portion 12.

Figure 3A:
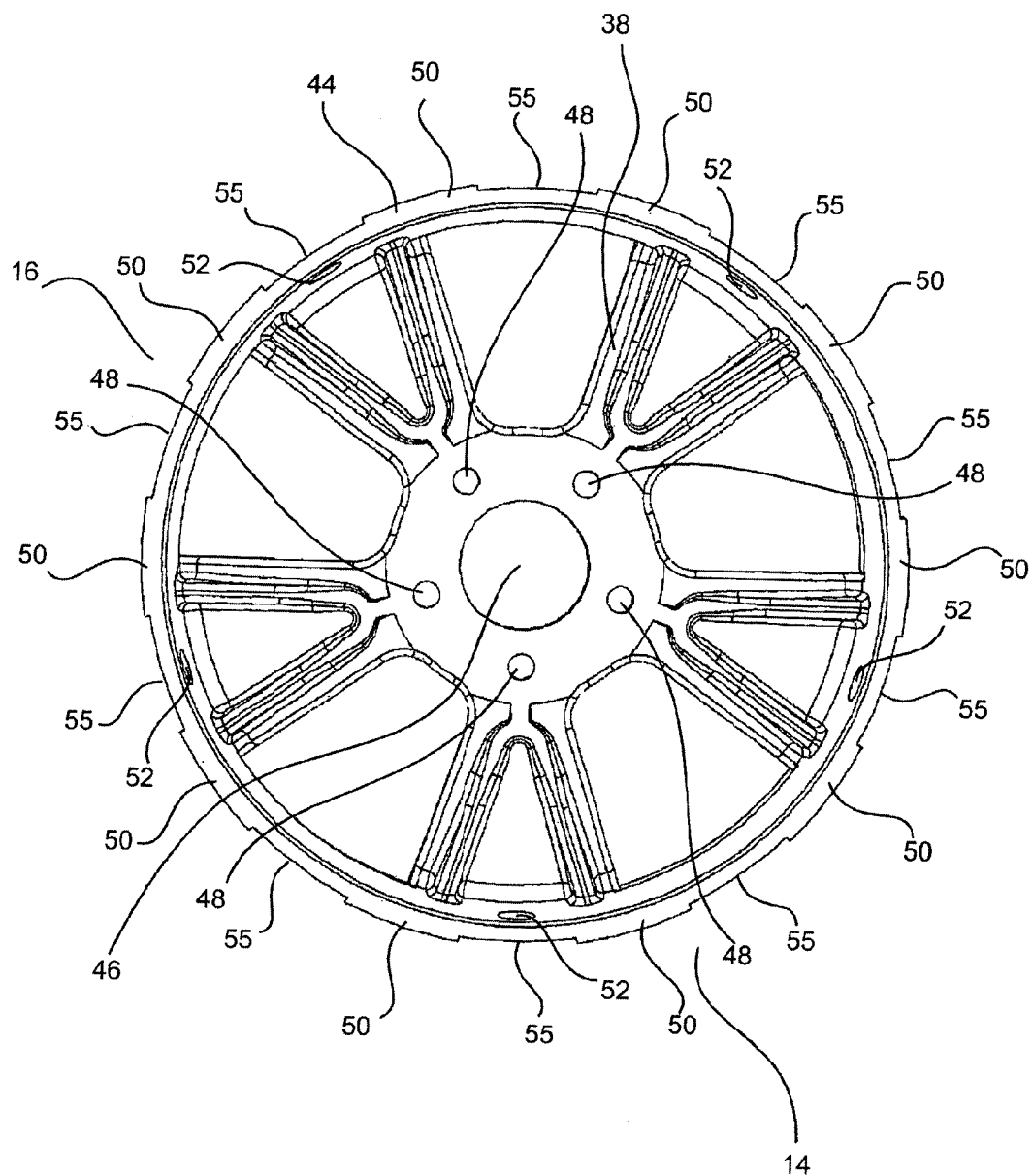
Figure 3B:
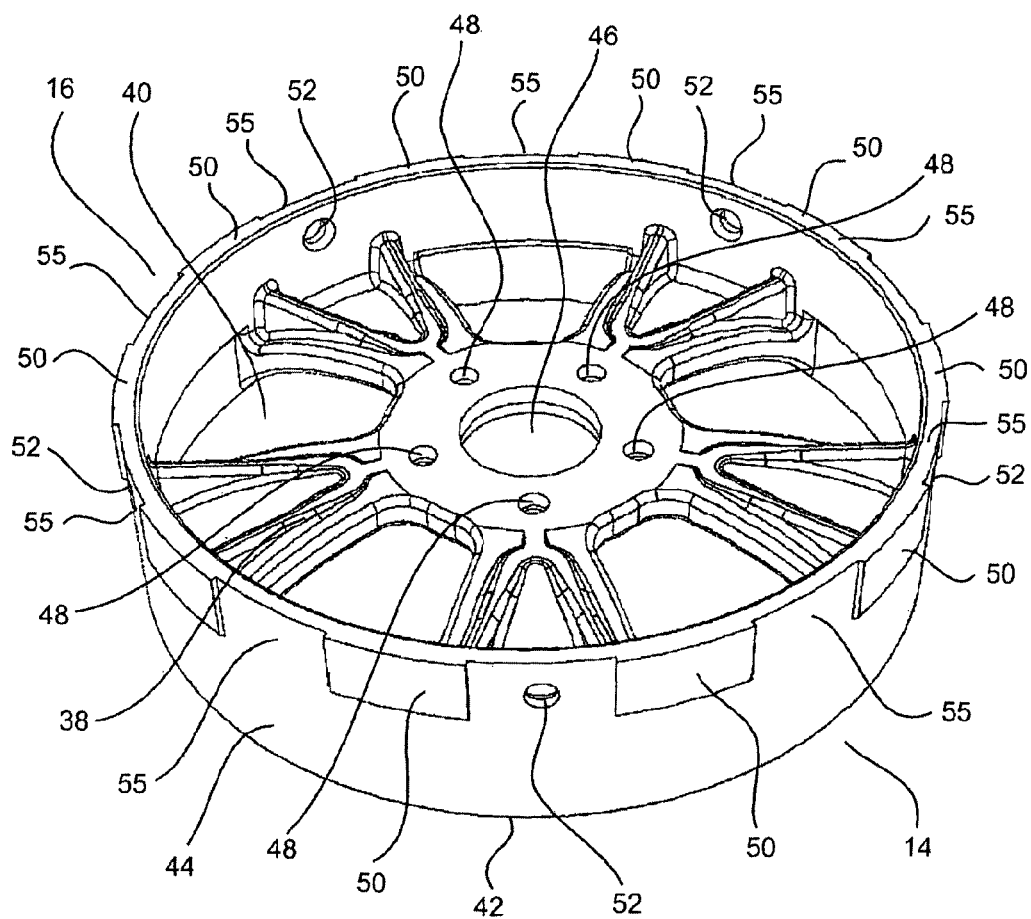
Figure 4A:
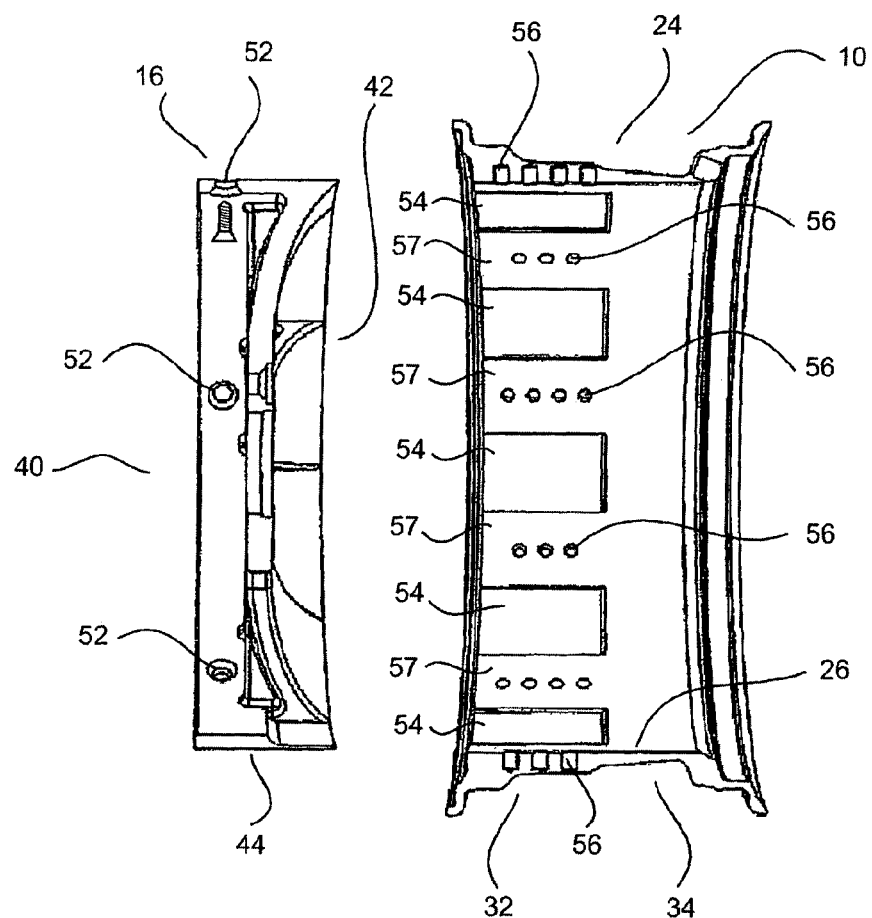
FIG. 4a is a side cross-sectional view of the wheel shown in FIG. 1a during mounting of the hub member into the rim.
Figure 4B:
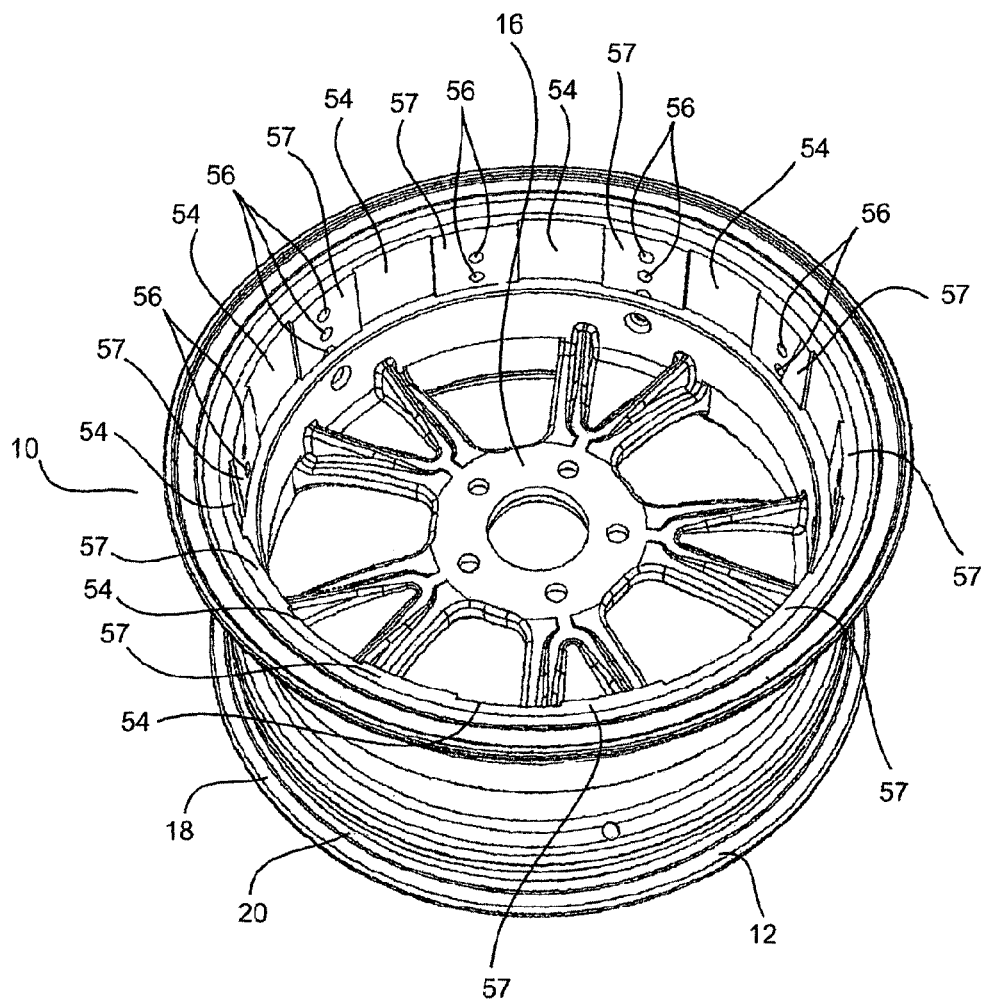
FIG. 4b is a perspective view of the wheel shown in FIG. 1a incorporating the hub member.

Referring now to FIGS. 3a and 3b and 4a, the centre disc 16 comprises a generally circular plate 38 formed of appropriate material. The plate 38 has a rear portion 40, a front portion 42 and an outer periphery 44. The plate 38 incorporates a centre hole 46 and circumferentially spaced mounting holes 48 for receiving wheel studs. The outer periphery 44 is of a diameter which allows the plate 38 to be received within the confines of the annular inner face 26 of the rim portion 12. The centre disc 16 comprises splines 50. The splines 50 are extended around the periphery 44 of the centre disc 16 and spaced apart with respect to each other. In this manner a spacing 55 is defined between each neighbouring spline 50. A plurality of openings 52 is arranged around the periphery of the centre disc 16. The openings 52 traverse radially the outer periphery 44 of the centre disc 16. As will be described with reference to the method of assembly of the wheel 10, the fact that the openings 52 traverse radially the centre disc 16 allows securing the centre disc 16 to the rim portion 12 via screws (see FIG. 4a). Each opening 52 is located between particular neighbouring splines 50 in the respective spacing 55. As shown in FIG. 3b, five openings 52 are arranged around the periphery of the centre disc 16 such that two splines 50 and one spacing 55 is located between neighbouring openings 52.

The splines 50 of the centre disc 16 are adapted to be received by grooves 54 located at the rim portion 12. As shown in FIG. 1a, the rim portion 12 comprises the grooves 54 and a plurality of sets of threaded indentations 56 for securing the centre disc 16 to the rim portion 12. The grooves 54 and the threaded indentations 56 extend around the inner face 26 of the rim portion 12. The grooves 54 are arranged around the rim portion 12 such that a spacing 55 is defined between each neighbouring groove 54. A ridge 57 is defined at each spacing 55. Each set of threaded indentations 56 traverse a particular ridge 57.

The set of threaded indentations 56 comprise a plurality of threaded indentations 56 aligned in a straight line parallel to the axis of rotation of the wheel 10. There are two sets of threaded indentations 56. A first set of threaded indentations 56 comprises four threaded indentations 56. A second set of threaded indentations 56 comprises three threaded indentations 56. The first set and the second set of threaded indentations 56 are alternatively arranged around the inner face 26 of the rim portion 12.

Figure 2:
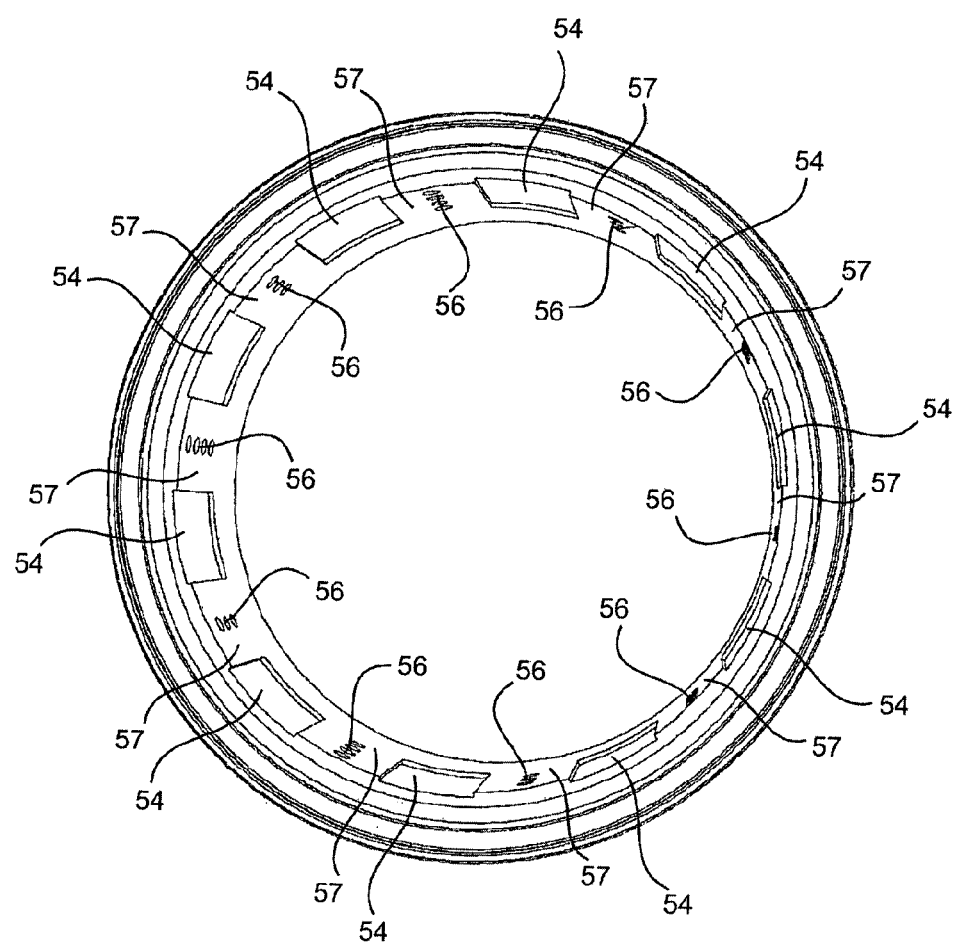

Referring to FIG. 2, the rim portion 12 comprises the grooves 54 around the inner face 26 of the rim portion 12. The grooves 54 extend around the inner face 26 and spaced apart with respect to each other. In this manner ridges 57 are defined between each neighbouring groove 54. As will be explained, with reference to the method of assembly of the wheel 10, the grooves 54 of the rim portion are adapted to receive the splines 50 of the centre disc 16 and the spacing 55 of the centre disc 16 are adapted to receive the ridges 57 of the rim portion 12 when the centre disc 16 is mounted into the rim portion 12.

The splines 50 allow transfer of the torque provided by the vehicle during use of the wheel 10.

As mentioned before, the rim portion 12 comprises first and second set of threaded indentations 56 arranged around the inner periphery of the rim portion 12. The threaded indentations 56 are adapted to receive the screws referred to previously when describing the centre disc 16. As said before, in this manner the centre disc 16 is releasably attached to the rim portion 12.

Further, as previously described, the threaded indentations 56 are arranged in a straight line parallel to the axis of rotation. This allows locating the centre disc 16 along the axis of rotation of the wheel 10 in any of a plurality of available positions. In this manner, different offset or backspace positions for the centre disc 16 may be provided.

In the arrangement shown in the figures, the different available positions include seven available positions. The centre disc 16 can be secured to the rim portion 12 at any of the seven available positions. By securing the centre disc 16 at different available positions, the wheel centre offset may be adjusted. As will be described with the method of assembly of the wheel 10, this allows fitting any type of centre disc 16 to a multitude of different type of vehicles.

The number of available positions depends on the number of threaded indentations 56 that are arranged parallel to the axis of rotation of the wheel 10. As mentioned before, the wheel 10 in accordance with the present embodiment of the invention comprises seven available positions.

Referring to FIG. 1a, the first and second sets of threaded indentations 56 are alternatively arranged around the radially inner face of the rim. Thus, between two first sets of threaded indentations 56 is located a second set of threaded indentations 56. As shown in FIG. 1a, the first set of threaded indentations 56 provides four available positions. The second set of threaded indentations 56 provides three available positions. The reason that the first set of threaded indentations 56 provides a number of available positions that differ from the number of available positions provided by the second set of threaded indentations 56 is that the second set of threaded indentations 56 is located offset with respect to the first set of threaded indentations 56. Each of the threaded indentations 56 of the second set is located at a different position.

As will be explained with reference to the method of assembly of the wheel 10, the fact that there are the first and the second set of threaded indentations 56 facilitates locating particular centre discs 16 at the proper available positions which allow proper fitting of the wheel 10 to the vehicle.

The arrangement in accordance with the present embodiment of the invention allows releasable attachment to the rim portion 12 a great variety of different types of centre discs 16 in accordance with the preference of the user of the vehicle. In particular, the embodiment of the present invention is particularly useful for fitting wheels 10 having wheel deep dishes and wheel shallow dishes. This is because the rim portion 12 provides a plurality of available positions along the axis of rotation of the wheel 10. Depending on the type of centre disc 16 (wheel deep dish centre disc or wheel shallow dish centre disc) that is to be secured to the rim portion 12 of the wheel 10 (incorporating the particular centre disc 16) may be fitted to any of a multitude of vehicles. This is accomplished by securing the particular centre disc 16 at the available position of the rim portion 12 which allows fitting the wheel 10 properly to a particular vehicle. By locating the particular centre disc 16 at a different available position of the rim portion 12 the wheel 10 may be fitted to a different type of vehicle.

FIGS. 5a to 5d shows an example of a plurality of centre discs 16 in accordance with the present embodiment. FIGS. 5a, 5c and 5d show a variety of arrangements of positive and negative offset/backspace adjustments in centre disc 16, FIG. 5b shows a variety of arrangements of negative offset/backspace adjustments in centre disc 16 in accordance with the present embodiment of the invention.

The fact that the centre disc 16 is releasably attached to the rim portion 12 allows varying the centre disc 16 after manufacture of the wheel 10. This allows varying the wheel 10 in accordance with current trends or the preference of a particular owner of a vehicle. This is particularly advantageous because it allows the user of the vehicle to choose the type of centre disc 16 in accordance with the user's preference or the parameters of a particular vehicle without having to change the entire wheel 10.

For manufacturing the wheel, the centre disc 16 is secured within the rim portion 12 by sliding the splines 50 of the centre disc 16 into the respective grooves 54 of the rim portion 12. FIG. 4a shows a centre disc 16 being presented to the rim portion 12 for securing the centre disc 16 onto the wheel 10. For securing the centre disc 16 to the rim portion 12, each spline 50 is presented to the respective groove 54 of the rim portion 12 and pressure is applied to the centre disc 16 to locate the centre disc 16 to the desired available position. At the desired available position the openings 52 of the centre disc 16 are aligned with the threaded indentations 56 of the rim portion 12 located at that particular available position. At this stage, the centre disc 16 may be secured to the rim portion 12 by inserting the screws into the openings 52 of the centre disc 16 and screwing the screws into the threaded indentations 56 of the rim portion 12.

As mentioned before, in the arrangement of the present embodiment of the invention shown in the figures, there are first and second sets of threaded indentations 56. Each of the set of threaded indentations 56 provide different available positions for locating the centre disc 16 within the rim portion 12 at a particular location along the axis of rotation of the wheel 10. The first set of threaded indentations 56 provides four available positions; the second set of threaded indentations 56 provides three available positions.

As mentioned before, the centre disc 16 comprises openings 52 which are located at particular locations around the periphery of the disc. In the arrangement shown in FIG. 3, there are five openings 52 wherein each neighbouring opening is separated by a pair of splines 50 separated by a spacing 55. In contrast, as shown in FIG. 2, each threaded indentations 56 of the rim portion 12 is separated by a groove 54. In view of this arrangement of centre disc 16 and rim portion 12 the centre disc 16 must be rotated around the axis of rotation of the wheel 10 in order to locate the centre disc 16 at a particular available position.

To locate the centre disc 16 at any of the available positions provided by the first set of threaded indentations 56, the centre disc 16 must be presented to the rim portion 12 such that, when the centre disc 16 is being inserted into the rim portion 12, the openings 52 of the centre disc 16 coincide with the threaded indentations 56 of the first set of threaded indentations 56. However, to locate the centre disc 16 at any of the available positions provided by the second set of threaded indentations 56, the centre disc 16 must be presented to the rim portion 12 such that, when the centre disc 16 is being inserted into the rim portion 12, the openings 52 of the centre disc 16 coincide with the threaded indentations 56 of the second set of threaded indentations 56.

The fact that the centre disc 16 must be presented at a different rotational orientation for being located at particular available locations is particularly advantageous. This allows guidance to the wheel fitter in charge of fitting the wheel 10 to the vehicle to secure particular centre discs 16 to the available positions which are appropriate in order for the wheel 10 to properly fit to the vehicle. For example, the first and second set of threaded indentations 56 may be arranged on the rim portion 12 such that deep dish centre discs are rotated such that when inserted into the rim portion 12 the openings 52 of the deep dish centre disc must align with the threaded indentations 56 of the first set of threaded indentations 56. The shallow dish centre discs may be rotated such that the openings 52 of the shallow dish centre disc must align with the threaded indentations 56 of the first set of internal indentations. As mentioned before, this facilitates fitting the wheel 10 on the vehicle because it provides a guide to the wheel fitter for which available positions may be appropriate for a particular centre disc 16.

In a particular arrangement of the present embodiment of the invention, the grooves 54 (of the rim portion 12) and splines 50 (of the centre disc 16) may be configured such that the centre disc can be mounted onto particular rims. In an arrangement, the splines 50 and grooves 54 have matching cross sections. This is the cross section of the splines 50 is such that it coincides with the cross section of particular grooves 54. For example, the spline 50 could have a hexagonal cross section. In this particular case the spline 50 would fit in a groove 54 having a hexagonal cross section. This arrangement is particularly advantageous because it allows fitting particular centre discs 16 only to particular rims 12. The reason for this is that the cross section of the spline and of the groove must coincide such that a particular centre disc 16 fits into a particular rim portion 12.

As mentioned before, in accordance with the present invention the wheel 10 can be constructed in accordance with the specifications required for installation on a particular vehicle. Once the relative position of the centre disc 16 relative to the rim portion 12 is known for a particular vehicle, the centre disc 16 can be fitted in position at the required available position of the rim portion 12. This allows fitting a particular type of wheel 10 to a multitude of different type of vehicles. Thus, in accordance with the present embodiment of the invention a wheel 10 can be assembled according to a required specification by fitting the centre disc 16 to the rim portion 12 at the available position such that the wheel 10 may be fitted to a particular vehicle.

Moreover, as explained before, in accordance with the present embodiment of the invention it is possible to modify the wheel 10 after the wheel 10 has been manufactured. For this, the centre disc 16 is removed and a different centre disc 16 may be secured to the rim portion 12. Thus, there is no need to change the entire wheel 10 if the owner of a vehicle wants to change the external appearance of the wheels 10 of the vehicle. This is possible in view that the centre disc 16 is releasably attached to the rim portion 12.

From the foregoing, it is evident that the present embodiment provides an arrangement which allows a wheel 10 to be assembled to fit a particular vehicle in a simple yet highly effective manner.

Modifications and variations as would be apparent to a skilled addressee are deemed to be within the scope of the present invention. For example, in accordance with the present embodiment of the invention, the centre disc 16 comprises the splines 50 and the inner face 26 of the rim portion 12 comprises the grooves 54. Alternatively, the splines may be located at the inner face 26 and the grooves 54 may be incorporated in the centre disc 16.

Moreover, in an alternative embodiment, the means for releasably attaching the centre disc 16 to the rim portion 12 may not incorporate a spline-groove assembly as is the case in the present embodiment of the invention. Instead, the means for releasably attaching the centre disc 16 to the rim portion 12 may include, for example, screw means or other for securing the centre disc 16 to the rim portion 12 as well as for transferring the torque applied to the centre disc 16 to the rim portion 12.

In a further arrangement, the outer periphery 44 of the centre disc 16 and the inner face 26 of the rim portion 12 may be configured to define keyways adapted to receive a key for fastening the centre disc 16. The key would fasten the centre disc 16 and the rim portion 12 to allow torque to be transferred from the centre disc 16 to the rim portion 12. In a further alternative arrangement, the spline 50 and grooves 54 may be configured such that each pair of spline 50 and groove 54 define a keyway adapted to receive a key for fastening of the centre disc 16 to the rim portion 12 and allow transference to the rim portion 12 of the torque applied to the centre disc 16 or transference of forces from the rim portion 12 to the centre disc 16 while driving/braking forces are applied.

Further, it should be appreciated that the scope of the invention is not limited to the scope of the embodiments disclosed.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The invention claimed is:

1. A wheel comprising
   a rim portion,
   a center portion for supporting the rim portion, and
   the rim portion and center portion including a sliding spline and groove arrangement providing relative sliding adjustment of the rim portion and center portion parallel to the wheel's axis of rotation,
   the wheel having an adjustable offset of the rim portion relative to the center portion along an axis of rotation of the wheel by sliding of the center portion and the rim portion relative to one another parallel to the axis of rotation of the wheel with the center portion within the rim portion,
   wherein the rim is adapted for attachment of the center portion to a radially inner portion of the rim portion at a selected position of a plurality of available positions disposed around the radially inner portion of the rim portion and in a direction parallel to the axis of rotation of the wheel, and
   releasable securing means that releasably secure the center portion and the rim together at a selected rim portion to center portion axial offset, the securing means received into the rim portion from the radially inner portion thereof.

2. A wheel according to claim 1 including attachment means for locating the center portion relative to the rim portion to transfer rotary movement of the center portion to the rim portion or rotary movement of the rim portion to the center portion.

3. A wheel according to claim 2 wherein the attachment means for attaching the center portion to the rim portion comprises a plurality of splines and a plurality of grooves, each groove adapted to receive a respective spline to facilitate the sliding of the center portion and the rim portion relative to one another.

4. A wheel according to claim 3 wherein the rim portion presents a radially inner face comprising the plurality of grooves.

5. A wheel according to claim 4 wherein the center portion is configured as a disc structure having an outer periphery dimensioned to be received within the confines of the radially inner face of the rim portion the outer periphery comprising the splines.

6. A wheel according to claim 3 including the plurality of the grooves arranged in a spaced apart relationship with respect to each other around the radially inner face of the rim.

7. A wheel according to claim 3 including the plurality of splines arranged in a spaced apart relationship with respect to each other around the outer periphery of the disc structure of the center portion.

8. A wheel according to claim 3 wherein there is at least one threaded indentation located between two neighbouring said grooves and at least one opening traversing the outer periphery of the disc structure located between two neighbouring said grooves.

9. A wheel according to claim 8 wherein there are a plurality of threaded indentations defining a set of threaded indentations, each of the threaded indentations are arranged in a spaced apart relationship with respect to each other and parallel to the rotational axis of the wheel, each of the at least one threaded indentations providing a position of the plurality of available positions for securing the center portion at a location along the rotational axis of the rim portion.

10. A wheel according to claim 9 wherein there are more than one set of the threaded indentions, the sets being arranged in a spaced apart relationship with respect to each other around the periphery of the radially inner face of the rim portion.

11. A wheel according to claim 10 wherein there are a first set of threaded indentations and a second set of threaded indentations, the first set of threaded indentations and the second set of threaded indentations being alternatively arranged around the radially inner face of the rim.

12. A wheel according to claim 11 wherein the first set of threaded indentations comprises at least one threaded indentation located at a first location parallel to the rotational axis of the wheel and the second set of threaded of indentations comprises at least one threaded indentation located at a second location parallel to the rotational axis of the wheel, the second location being a different location with respect to the first location.

13. A wheel according to claim 3 wherein at least one of the splines and at least one of the grooves have matching cross sections to facilitate the at least one said spline to be slideably received by the at least one groove.

14. A wheel according to claim 1 wherein the securing means for securing the center portion to the rim portion further comprises at least one opening through one or more portions of the center portion the at least one opening being adapted to receive a screw threaded fastener.

15. A wheel according to claim 1 wherein the securing means for securing the center portion to the rim portion further comprises at least one threaded indentation into the rim and adapted to receive the screw threaded fastener, the threaded indentation extending into the radially inner face of the rim.

16. A wheel according to claim 1 wherein engagement of the center portion to the rim portion includes at least one keyed joint.

17. A wheel according to claim 16 wherein the outer periphery of the center disc and the inner portion of the rim are configured to define at least one keyway adapted to receive a key of the keyed joint.

18. A wheel according to claim 1, wherein the spline and groove arrangement transfers at least some rotational force from the center portion of the rim during powered rotation of the wheel.

19. A method of constructing a wheel having a rim portion and a center portion adapted to be attached to the rim portion, the method comprising the steps of: locating the center portion to the rim portion at a selected position of a number of selectable positions along an axis of rotation of the wheel by sliding the center portion and the rim portion relative to one another parallel to an axis of rotation of the wheel, and releasably attaching the center portion to the rim portion at the selected position by engagement of a sliding spline and groove arrangement allowing sliding adjustment of the rim portion and center portion parallel to the wheel's axis of rotation, and applying securing means from the radially inner portion into the rim portion.

20. A method of claim 19, further including an attachment means incorporating a splined and grooved arrangement for locating the center portion within the rim portion, whereby splines on one of the rim or center portion engage with respective grooves on the other of the center or rim portion during the sliding of the rim and center portions relative to one another to positively locate the rim and center portions relative to one another.

21. A vehicle wheel rim having a spline or groove arrangement to positively locate to the rim a wheel center portion having a corresponding opposite groove or spline arrangement, the spine and groove arrangement allowing relative axial position adjustment of the rim and wheel center along an axis parallel to an axis of rotation of the wheel, and a number of spaced fastening apertures in the rim for use in securing the center portion and the rim together at a chosen axial offset position of the center portion relative to the rim.

22. A wheel according to claim 21, wherein the spline and groove arrangement transfers at least some rotational force from the center portion of the rim during powered rotation of the wheel.

* * * * *